Nov. 28, 1944.   I. P. MELAAS   2,363,740
ANIMAL TRAP WITH AUXILIARY SPRING
Filed Jan. 13, 1944
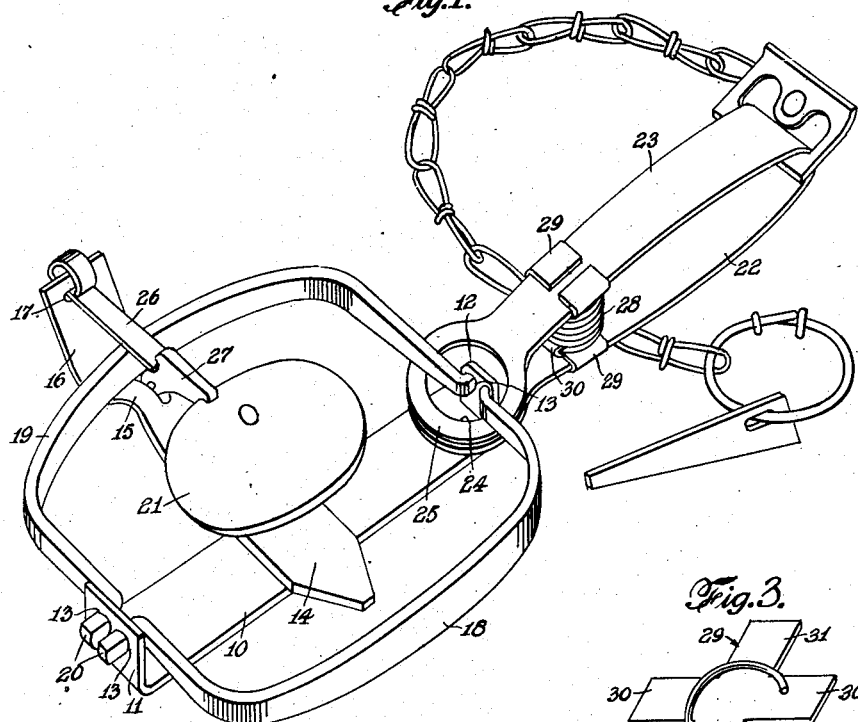
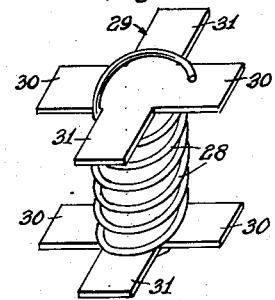
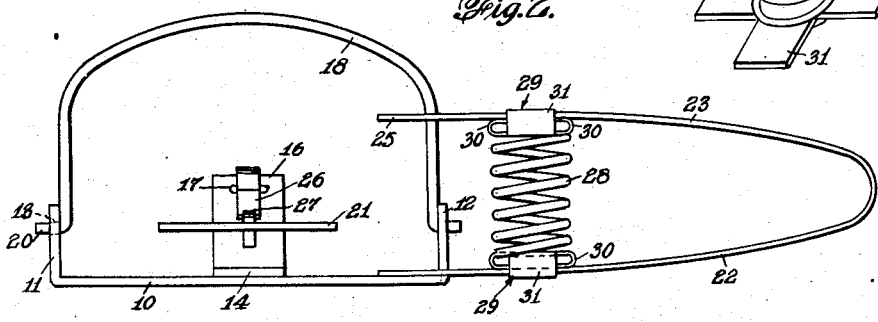
INVENTOR.
IVER P. MELAAS
BY
ATTORNEY.

Patented Nov. 28, 1944

2,363,740

UNITED STATES PATENT OFFICE 2,363,740

ANIMAL TRAP WITH AUXILIARY SPRING

Iver P. Melaas, Stony Brook, Minn.

Application January 13, 1944, Serial No. 518,107

3 Claims. (Cl. 43—88)

This invention relates to traps, such as are used in catching animals, lured by a bait displayed thereon, and which upon being seized by an animal, releases a spring, causing closure of jaws upon whatever has molested the bait.

Successful operating of such traps depend on the quick, instantaneous action of the spring and also its force. If too slow the animal may retreat; if too weak, it may escape from between the jaws.

It is therefore an object of this invention to provide an animal trap, of the common spring actuated type, with a reinforcing spring whereby the action of the trap is materially intensified.

A further feature is in the provision of such springs, together with connecting clips, that can be applied at any time to presently made traps in an easy and efficient manner.

Another purpose is to produce an auxiliary spring having slidable connections adjustable on the main spring of the trap.

These objects are accomplished by the novel construction, combination and arrangement of few and simple parts hereinafter described and illustrated in the accompanying drawing, constituting a graphical component of this disclosure, and in which:

Figure 1 is a perspective view of a conventional type of spring trap, in an open or set condition, and showing an application of the invention.

Figure 2 is a side elevational view of the same when in a closed or sprung condition.

Figure 3 is a perspective view of the connecting clips and spring.

Referring in detail to the drawing, the trap is shown to consist of a metal base 10, usually a flat strip, having at its outer end an upstanding right angled flange 11, and at its opposite end a similar flange 12, but of lesser width, each containing paired circular openings 13.

Rigidly fixed midway on this base is a cross strip 14, reversely bent as at 15, and terminating in an angularly raised end 16, in which is a short transverse slot 17.

A pair of bow shaped jaws 18 and 19, are provided with outturned pivots 20 rotatable in the openings 13, the jaws having their side portions abutting the inner sides of the flanges 11 and 12.

A bait platform 21 is mounted above the cross strip 14, centrally between the jaws 18 and 19, to carry a lure for the animal to be trapped.

Rigidly secured on the inner end of the base strip 10 is the lower element 22 of a strong U shaped spring, its upper element 23 having a circular opening 24, directly over the base flange 12, the portion 25 of the element 23, impinging forcibly against the under edges of the sides of the jaws 18 and 19, tending to close them together.

This is prevented, when the trap is in a set position, by a latch 26 hingedly mounted in the slot 17 at its outer end, and held at its inner end by a trigger 27, pivoted in the cross strip at 15, the outer end of the trigger supportingly engaging the platform 21, until by movement thereof when the trap is sprung.

Interposed between the elements 22 and 23 of the U spring, is an open coiled compression spring 28, held in adjusted position by clips 29, consisting of a four armed cross shaped piece of flexible metal.

Two oppositely disposed arms 30 are bent to interengage the outer coils of the spring, while the other pair 31 constitute a slide to partially surround the spring elements 22 and 23 respectively.

These clips can be assembled by an ordinary pair of pinchers, by hand, without difficulty, and may be disposed at any point along the length of the springs 22—23.

Having thus described the invention what is claimed as new and sought to secure by Letters Patent, is:

1. In combination with an animal trap having opposed jaws and a U shaped spring having means to close the jaws; an auxiliary coiled spring interposed between the members of said U shaped spring and clips at the ends of said coiled spring adjustable on the members of said U shaped spring.

2. The combination with an animal trap having opposed pivoted jaws and a flat spring bent to provide upper and lower members; the lower of said members being fixed and the upper having means to close said jaws when sprung, a clip adjustably engaged on each of said members, and a helical spring fixed at its respective ends in said clips.

3. In combination with an animal trap having opposed jaws and a U shaped spring having means to close the jaws; an auxiliary coiled spring interposed between the members of said U shaped spring and a pair of cross shaped clips having two of their opposed arms engaged with the ends of said spring and the remaining arms embracing the members of said U shaped spring.

IVER P. MELAAS.